United States Patent [19]
Collins

[11] Patent Number: 4,606,681
[45] Date of Patent: Aug. 19, 1986

[54] TUD RETHREADING AND CLEANING DEVICE

[76] Inventor: Bobby W. Collins, 4200 A Chateau Blvd., Kenner, La. 70062

[21] Appl. No.: 489,008

[22] Filed: Apr. 27, 1983

Related U.S. Application Data

[63] Continuation-in-part of Ser. No. 06/214,965, Dec. 10, 1980, abandoned.

[51] Int. Cl.$^4$ .............................................. B23G 5/04
[52] U.S. Cl. ..................... 408/215; 10/1 B; 10/123 R; 408/221; 408/239 R
[58] Field of Search ............... 408/215, 218, 220, 221, 408/212, 213, 216, 217, 219, 222, 223, 239 R; 10/123 R, 1 B, 111, 113, 120

[56] References Cited

U.S. PATENT DOCUMENTS

| | | | |
|---|---|---|---|
| 1,950,704 | 3/1934 | Thomson | 408/217 |
| 2,242,954 | 5/1941 | Ingwer | 408/215 |
| 2,517,062 | 8/1950 | Vosper | 408/215 X |
| 2,855,613 | 10/1958 | Kostka | 10/123 R X |
| 3,031,669 | 5/1962 | Fleury | 408/215 X |
| 4,095,917 | 6/1978 | Wesner | 408/221 X |
| 4,180,144 | 12/1979 | Adams | 10/1 B X |
| 4,201,503 | 5/1980 | Nannen | 408/215 |
| 4,408,363 | 10/1983 | Doree | 10/1 B |
| 4,414,701 | 11/1983 | Johnson | 10/1 B X |

Primary Examiner—Gil Weidenfeld
Assistant Examiner—Glenn L. Webb
Attorney, Agent, or Firm—William David Kiesel; Robert C. Tucker; J. Bradley Overton

[57] ABSTRACT

A device for rethreading and cleaning threaded pipe studs having an elongated casing having an outside surface provided with flat portions for attaching to a torquing means, which casing is provided with a straight channel therethrough shaped to allow passage of the pipe stud with at least a portion of the channel sidewalls having an inside diameter slightly larger than the outside diameter of the pipe studs, and having multiple threading dies attached to the channel sidewalls at one open end with the teeth protruding perpendicularly from the channel sidewalls, wherein the teeth on each threading die projects consecutively shallower into the channel as they progress from the open end.

4 Claims, 3 Drawing Figures

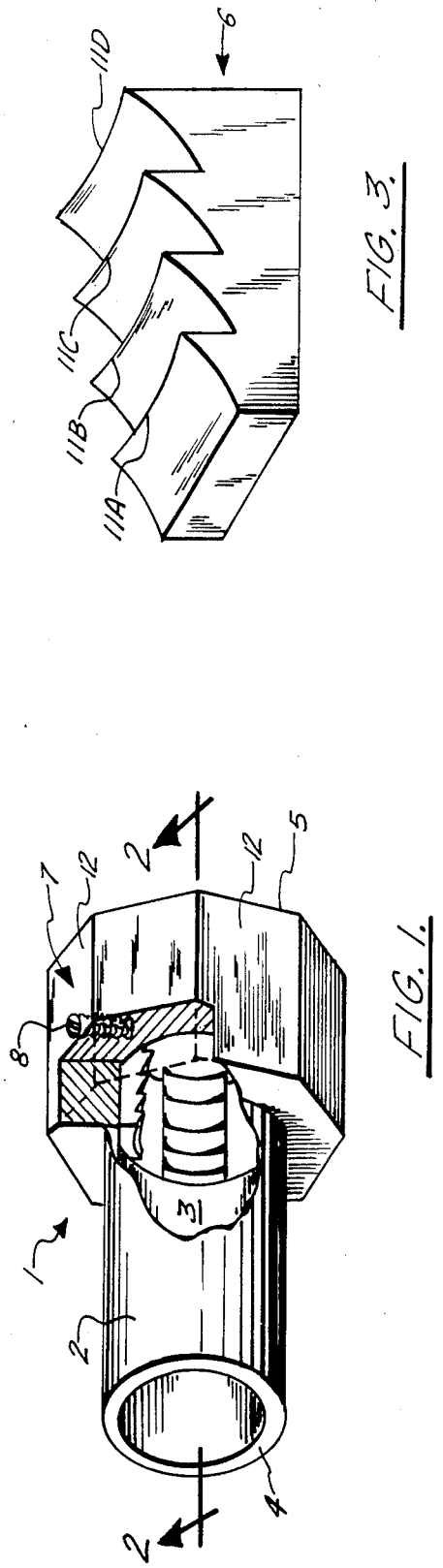
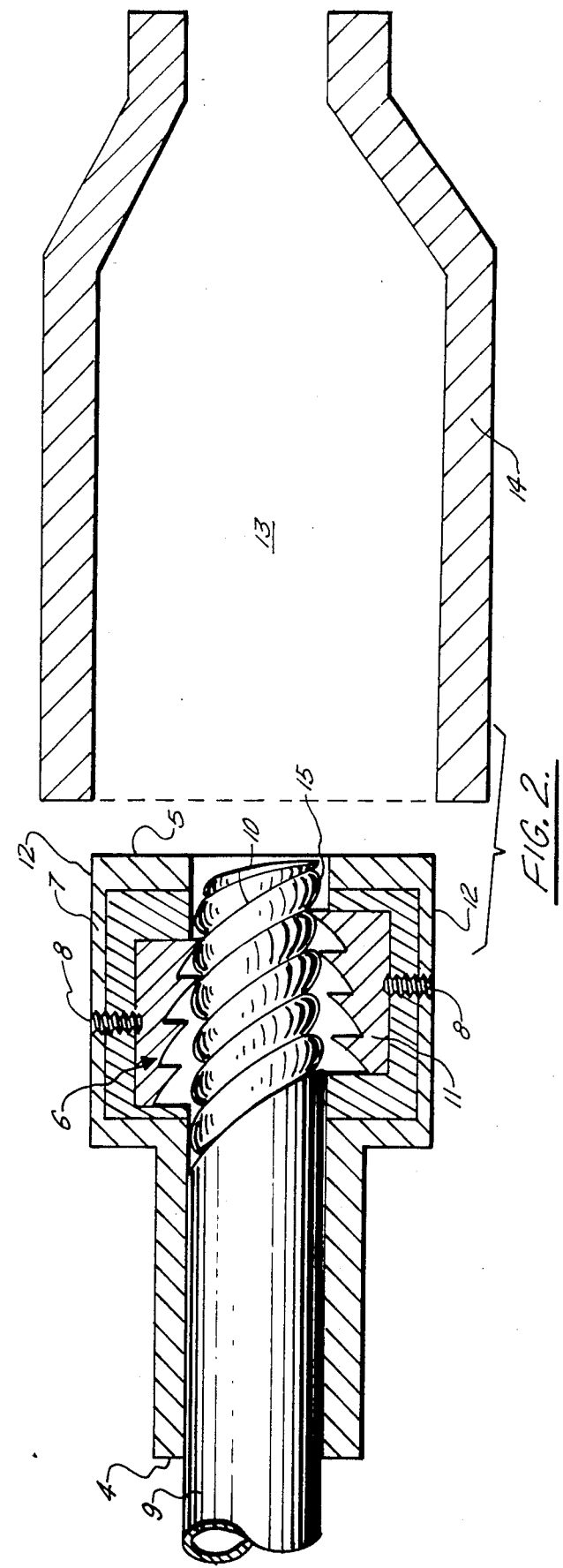

TUD RETHREADING AND CLEANING DEVICE

RELATED APPLICATIONS

This is a continuation-in-part of U.S. patent application Ser. No. 06/214,965, filed Dec. 10, 1980, now abandoned, by the inventor herein, entitled "Stud Rethreading and Cleaning Device", specific mention being made for the purpose of obtaining benefit of its filing date.

BACKGROUND OF THE INVENTION

1. Field of the Invention

This invention relates to devices for rethreading and cleaning threaded pipe studs.

2. Prior Art

Although many pipe threading devices are available for threading pipes, none are capable of operating on flange pipe studs mounted in place on field equipment. This problem is particularly acute in the oil field industry where periodic maintenance of flange studs in a "Christmas tree" is necessary. In this situation, the close proximity of the flange studs to other parts of the installation render present devices useless.

SUMMARY OF THE INVENTION

Therefore, it is an object of this invention to provide a device for rethreading or cleaning pipe studs, access to which is limited.

Another object of this invention is to provide a hydraulic torque wrench add-on device for rethreading and cleaning threaded flange studs.

Other objects and advantages of this invention will become apparent from the ensuing descriptions of the invention.

Accordingly, a device for attaching to a torque means and to be used to rethread and clean threaded pipe studs is provided having an elongated casing provided with a straight hollow channel opening out at opposite ends of the casing, one end having an exterior shape to fixedly attach to the torque means for rotation thereby and the opposite end shaped to receive the pipe stud, and the first end having multiple cutting dies perpendicularly attached to and spaced about the channel sidewall, each die has consecutively positioned teeth projecting shallower into the channel away from the first end.

BRIEF DESCRIPTION OF THE DRAWINGS

FIG. 1 is a partial cutaway three-dimensional view of a rethreading device mounted for use on a hydraulic torque wrench.

FIG. 2 is a cross-sectional side view of a preferred embodiment of the device of this invention taken along lines 2—2 of FIG. 1 and also illustrating a cross-section of a torque wrench socket.

FIG. 3 is a three-dimensional view of a preferred embodiment of the cutting die assembly used in the device of this invention.

PREFERRED EMBODIMENTS OF THE INVENTION

Referring to the Figures, the rethreading and cleaning device, denoted generally by the numeral 1, comprises, in general, an elongated casing 2 having a channel 3 opening at opposite ends 4, 5 of casing 2, multiple cutting die assemblies 6 attached to octagonal cross-sectioned shoulder 7 by set screws 8.

To allow treatment of any length pipe stud, it is preferred that channel 3 has a cross-sectional diameter at both ends 4 and 5 greater than the cross-sectional diameter of pipe stud 9, but preferably only slightly larger than the outside diameter of pipe stud 9 so as to serve as a guide in aligning pipe threads 10 with die assemblies 6.

In another preferred embodiment, die assemblies 6 will be equally positioned around end 5 and die assemblies 6 are axially offset from the adjecent one (FIG. 2), wherein each assembly 6 has a set of rethreading teeth 11 projecting perpendicularly into channel 3. In a preferred embodiment, as seen in FIG. 3, the height of teeth 11 in each set are staggered in height wherein tooth 11A is shallower than tooth 11B and tooth 11B is shallower than tooth 11C, etc. The height and angle of teeth 11 are set so that tooth 11D strikes pipe stud 9 at the same depth and helix angle that stud threads 10 are desired to be shaped.

In another preferred embodiment, as seen in the Figures, end 5 is provided with flat surfaces 12 or other configurations (such as hexagon, octagon, etc.) shaped to be manipulated by torque wrench socket 14 having cavity 13 shaped to receive end 5 in an attached position. In an alternate embodiment, torque wrench socket 14 can be the drive arm of a hydraulic torque wrench.

The socket is fitted about shoulder 7 and device 1 is inserted over pipe 9 and turned by a torque wrench connected by conventional methods to the socket to rotate die assembly 6 about threads 10. Teeth 11 engage pipe stud tooth grooves 15 forcing out any foreign matter as cleaning device 1 is rotated about pipe 9. At the same time, the gradual increase in depth of teeth 11 recuts pipe threads 10 to their proper shape.

In another preferred embodiment, brushes can be added to device 1 whereby pipe stud 9 is first brushed to remove large dirt and grim particles. This embodiment allows for more efficient use of teeth 11.

There are, of course, many obvious alternate embodiments not specifically shown, but which are meant to be included within the scope of this invention as defined by the following claims.

What I claim is:

1. A device for rethreading and cleaning threaded pipe or studs and attachable to a torque means, which comprises:
    (a) a casing having an elongated pipe receiving end and a die assembly end, said casing having a hollow straight, guide channel through both of said ends of said casing; said die assembly end of the casing having an exterior shape to matingly receive the torque means for rotation of the casing and having a rear opening of the channel;
    (b) multiple cutting die assemblies perpendicularly attached to and spaced about the inside sidewalls of said channel in said die assembly end, each die assembly having multiple teeth which, commencing with the tooth closest to the elongated pipe receiving end, are consecutively projecting further into said channel, each of said teeth being angled to correspond to the helix angle of the threads of said pipe stud, the tooth being farthest from the elongated pipe receiving end projecting to the bottom of the grooves of said threads, each of the die assemblies being axially offset from the adjacent one a distance equal to the pitch of the threads of said pipe or stud, and a front channel opening in said elongated pipe receiving end located at the opposite end of the casing and having a diameter sufficiently large to receive the pipe.

2. A device according to claim 1 wherein the multiple cutting die assemblies are equally spaced about said inside sidewalls.

3. A device according to claim 1 wherein the channel has a cross-sectional diameter at both ends greater than the cross-sectional diameter of the pipe.

4. A device according to claim 1 wherein the first casing end is provided with an exterior surface formed by adjacent flat walls.

* * * * *